J. C. WELLS.
FAUCET.
APPLICATION FILED NOV. 16, 1909.
980,718.
Patented Jan. 3, 1911.
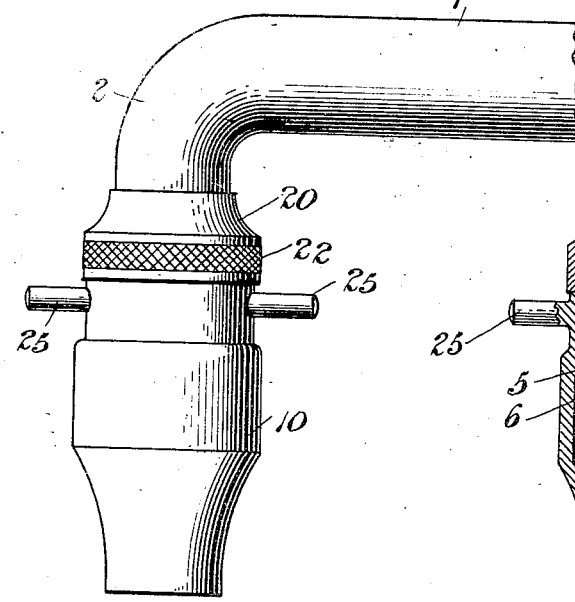
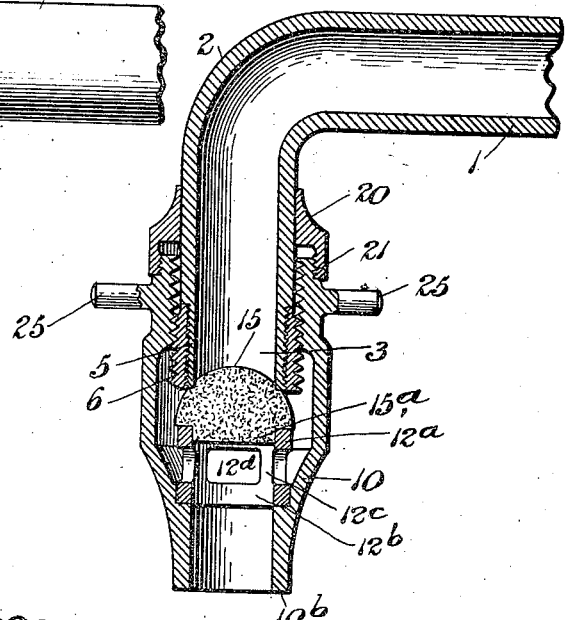
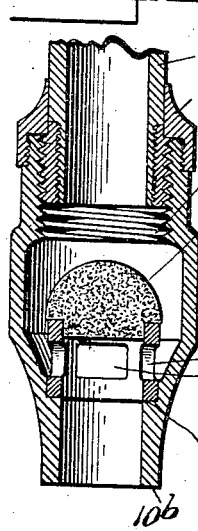
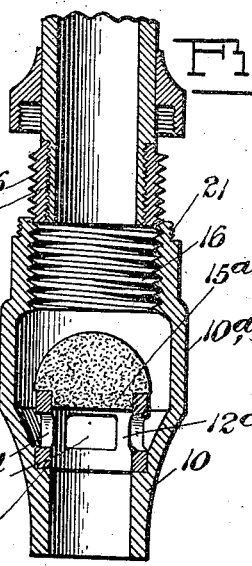
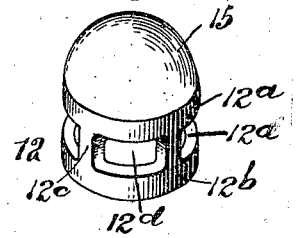
Witnesses.
Inventor,
Jesse C. Wells
By his Attorneys ated Jan. 3, 1911.
UNITED STATES PATENT OFFICE.

JESSE C. WELLS, OF BROOKLYN, NEW YORK.

FAUCET.

980,718.

Specification of Letters Patent. Patented Jan. 3, 1911.

Application filed November 16, 1909. Serial No. 528,375.

*To all whom it may concern:*

Be it known that I, JESSE C. WELLS, a citizen of the United States of America, and a resident of the borough of Brooklyn, in the county of Kings and State of New York, have invented certain new and useful Improvements in Faucets, of which the following is a specification.

The object of my present invention is to produce a simple, effective and economical faucet for water service pipes which can readily be removed from the pipe by the consumer for renewing the valve.

The objection to all of the many forms of faucets now in practical use on water service pipes is the difficulty and expense of repairing the same so that when one of these commonly used faucets leaks, it is necessary to send for a plumber, since the ordinary consumer is unable to repair the valve or washer, either because he is without the necessary tools, or does not possess sufficient mechanical skill to take the faucet apart. This difficulty is serious not only because of the expense incident to such minor repairs, but also because of the great waste of water from leaky valves when the faucets are in need of repairs.

I have produced an improved form of faucet for water service pipes consisting of a nozzle member threaded upon the outlet end of the service pipe and carrying a valve which is moved into engagement with the open end of the service pipe for shutting off the flow of water and is moved away from the end of the service pipe to permit the water to flow, said nozzle being free to rotate to open and close the valve, and provided with a collar which limits the opening movement of the nozzle and prevents its accidental disengagement from the service pipe.

I prefer to form the nozzle with an enlarged chamber formed with an annular seat to receive a valve supporting member in the form of a skeleton cylinder, and upon said valve support I mount a rubber or other elastic valve member preferably of mushroom shape with its hemispherical surface presented upwardly toward the open end of the service pipe. The outlet end of the service pipe is externally enlarged and this enlarged portion is threaded to receive the internally threaded nozzle member. The limiting collar is freely mounted upon the service pipe above the said enlargement and is threaded upon the nozzle member so as to rotate and move longitudinally upon the service pipe with said nozzle member, the opening movement of the nozzle member being limited by the engagement of said collar with the enlargement of the service pipe. To facilitate the mounting of the limiting collar upon the service pipe, I prefer to thread the end of the service pipe and screw thereon a threaded nut or collar of slightly larger diameter than the service pipe.

The nozzle and valve support are formed with free passageways of the same capacity as the service pipe, so that the nozzle supporting the valve can be applied to the service pipe while the water is running without danger of the water squirting out and wetting the operator.

In order that my invention may be fully understood, I will first describe the same with reference to the accompanying drawings and afterward point out the novelty more particularly in the annexed claim.

In said drawings, Figure 1 is a side elevation of my improved faucet. Fig. 2 is a vertical longitudinal sectional view of the same showing the valve in closed position. Fig. 3 is a similar view showing the valve open. Fig. 4 is a similar view showing the parts partially disconnected. Fig. 5 is a detail perspective view of the elastic valve and valve support.

1 is a section of an ordinary water service pipe. This section of the pipe is shown with a right angle bend at 2 to present the outlet 3 of the pipe downward. The outlet end of the pipe is reduced slightly in diameter providing an annular shoulder and is externally threaded as indicated at 5 to receive the internally and externally threaded nut or collar 6 having a reduced inner end flush with the surface of the outlet. The body of the nut or collar is of slightly larger diameter than the service pipe 1 and forms, when applied to the threaded end of the service pipe, an enlargement or shoulder for confining the nozzle limiting collar hereinafter referred to.

10 is the nozzle member formed with a central cylindrical enlargement as shown at 10ᵃ, and slightly tapered at its opposite end as shown at 10ᵇ. This nozzle 10 is formed with an internal annular shoulder 11 upon which rests a valve support 12 in the form of a skeleton cylinder made up of the two open rings 12ᵃ and 12ᵇ connected by the integral bars 12ᶜ.

15 is a soft rubber or other elastic valve of mushroom shape having a hemispherical surface which is adapted to rest upon the valve support 12, the circular stem portion 15ᵃ of the valve fitting snugly within one of the rings 12ᵃ or 12ᵇ of the valve support. When the mushroom valve 15 is in place upon the support 12, it closes up the opening through one of the rings 12ᵃ or 12ᵇ, but allows free passageway through the side openings 12ᵈ and through the other ring. This valve support 12 rests upon the annular shoulder 11 and supports the elastic mushroom valve 15 centrally within the enlarged portion 10ᵃ of the nozzle with the hemispherical surface of the valve member presented upwardly toward the open end of the service pipe.

The nozzle 10 is internally threaded at its inner end 16 to screw upon the external thread upon the enlarged collar or nut 6, and by screwing the nozzle upon said nut or collar the valve 15 is pressed up into the open end of the service pipe 1.

20 is the confining collar which fits loosely upon the service pipe 1 above the enlargement or nut 6. This collar 20 is internally threaded at 21 to screw upon the externally threaded and shouldered reduced end 22 of the nozzle 10, so that the collar 20 will move with the nozzle, and in the opening motion will engage the shoulder on the enlargement of the nut or collar 6 and limit the opening movement of the nozzle so as to prevent its accidental removal from the service pipe.

The nozzle 10 may be provided with radial lugs or fingers 25 or with other forms of projections to facilitate the rotation of the nozzle by hand. The limiting collar 20 is milled or roughened as shown at 22 to facilitate its rotation independently of the nozzle for disconnecting these parts.

In assembling the improved faucet, the collar 20 is slipped upon the end of the service pipe and the nut 6 screwed into place upon the reduced threaded end of the service pipe. The nozzle 10 with the valve support and valve in place is then placed in position as shown in Fig. 4 and screwed up upon the nut 6 until the valve 15 closes the outlet opening 3 of the service pipe. The limiting collar 20 is then screwed down upon the threaded portion 22 of the valve and the faucet will be found in condition for service.

The faucet is opened and closed by rotating the nozzle upon the service pipe, the rotation in one direction moving the valve away from and opening the outlet of the service pipe, while the rotation in the opposite direction moves the valve into engagement with and closes the service pipe. By reason of the limiting collar, the opening movement of the nozzle is confined so that it cannot be entirely screwed off of the enlargement at the end of the service pipe, thereby avoiding the danger of breaking a bowl or other receptacle which is supported beneath the faucet. If the improved valve should become worn and permit the faucet to leak, it is a simple matter for any consumer to disengage the collar 20 from the nozzle 10 and unscrew the nozzle from the service pipe and replace the worn valve with a new one. This operation consumes but a few moments so that it is unnecessary to cut off the supply of water while the repair is being made. When the new valve is in place, the nozzle is held in line with the open end of the service pipe so that the stream of water can flow into the open end of the nozzle and then rotated into engagement with the threaded enlargement of the service pipe. The capacity of the passageway through the nozzle and valve support is equal to the capacity of the service pipe so that the water will flow freely through the nozzle while it is being attached and there is no splashing or squirting of the water outside of the nozzle while the operation is being performed. The nozzle is screwed up until the valve cuts off the flow of water, when the limiting collar is again screwed in place.

The use of my improved faucet will prove a great convenience to consumers in that it enables the consumer to conveniently and quickly repair a leaky valve, thus obviating the annoyance of a leaky valve as well as the expense incident to having the repair made by a plumber. The improved faucet is also of importance in reducing the loss of water from leaky valves because of the convenience and slight cost of maintaining the same in good repair.

What I claim is:

The combination of a service pipe having a reduced externally threaded outlet providing an annular shoulder, an internally and externally threaded nut having a reduced inner end flush with the surface of the outlet and an enlarged outer end providing a shoulder at its reduced inner end, a confining collar fitting loosely upon the outlet and arrested by the shoulder surrounding the reduced end of the nut, a nozzle formed with a central cylindrical enlargement, with a tapered outlet having an internal annular shoulder, with an internal thread engaging the threaded enlargement of the nut and an external thread with which the internal thread of the confining collar engages, an invertible skeleton support resting upon the internal annular shoulder, and a valve of hemispherical shape having a circular stem fitting snugly in the skeleton support.

JESSE C. WELLS.

Witnesses:
 LAURA E. MONK,
 WM. E. KNIGHT